United States Patent Office 3,432,274
Patented Mar. 11, 1969

3,432,274
APPARATUS FOR THE CONTINUOUS
PRODUCTION OF MELAMINE
Kazuo Abe, Tokyo, Ryo Kokubo and Yumizuru Yamada, Fuchu-machi, Nei-gun, Mizuhiko Nagakura, Ichikawa, and Koji Shima, Fuchu-machi, Nei-gun, Japan, assignors to Nissan Kagaku Kogyo Kabushiki Kaisha, Tokyo, Japan, a corporation of Japan
Filed June 6, 1966, Ser. No. 555,487
Claims priority, application Japan, June 7, 1965, 40/33,363
U.S. Cl. 23—285                    6 Claims
Int. Cl. B01j 3/02; C07d 55/28

ABSTRACT OF THE DISCLOSURE

Apparatus for the continuous production of melamine comprising a reaction vessel divided into upper and lower reaction zones by a perforate first partition, a second perforate partition below said partition, pipes extending downwardly from certain of the perforations in said second partition, means for introducing molten urea near the bottom of said upper reaction zone, an outlet for gaseous reaction products near the top of said upper reaction zone, means for introducing gaseous ammonia near the bottom of said lower reaction zone at a point at least as high as the lower ends of certain passages, and means for withdrawing a lower reaction product from a point near the bottom of said lower reaction zone below the point at which said ammonia is introduced.

---

The present invention relates to apparatus for producing melamine from urea.

Use of the apparatus according to this invention permits the production of a high-purity melamine. Under appropriate conditions of temperature and pressure, melamine can be obtained by heating urea and ammonia together and a number of proposals have been made to carry out this process.

The most simple and reliable method for carrying out the process on an industrial scale utilizes a high pressure liquid phase without recourse to a catalyst. A melamine-producing reaction is caused by injecting urea into a large volume of hot melamine solution and part of the solution in the reaction zone is taken out as the end product. In this method the reaction vessel is of the uniform mixing type and accordingly when a single reaction vessel is used, a small amount of unreacted urea and intermediate reaction product will infiltrate into the end product, lowering the purity of the melamine obtained. For this reason the average purity of the products obtained by this method is never higher than 94–96%. The melamine reaction vessel used in carrying out the high pressure liquid phase method should preferably be a large-diameter cylindrical reaction vessel so that the heating may be uniform and no intermediate products may adhere to it. At least 0.5 liter of hot melamine per 1 kg./h. of urea should be supplied. But in such a reaction vessel of the uniform mixing type, the infiltration of unreacted substances and intermediate products into the ultimate product is unavoidable.

Therefore, to secure an end product of high purity, the solution, just before the end of the reaction, should be introduced into a second reaction vessel out of contact with the first reaction vessel; and the unfinished reaction should be brought to conclusion in said second vessel. In other words, a multistage reaction is preferable and it is even more preferable to extract only the solution obtained by the reaction of the first stage and treat it with pure ammonia gas in the second stage. The purpose of this treatment is to treat urea-series impurities, i.e., urea and ureidomelamine (2-ureido-4,6-diamino-S-triazine) with pure ammonia gas, thereby transforming them into melamine.

It is more economical, if the gas containing ammonia used in the second stage is reclaimed to be reused as added ammonia in the first stage reaction, thereby cutting down the ammonia consumption for the whole process.

However, if the exhausted gas from the second stage reaction is to be introduced into the first stage reaction, some means to step up the pressure is required, namely, a pump, blower or compressor. At present it is hard to get a means of transporting a gas which is mainly composed of high-temperature, high-pressure ammonia; and impractical to build a compressor for ammonia at a temperature in excess of 360° C. at a pressure of over 60 kg./cm.$^2$. When such gas has to be circulated its temperature must first be lowered to about 100° C. before it is sent to the compressor, and only after it has been compressed to a higher pressure by the latter, can it be heated up to the required temperature. This is a great disadvantage in terms of thermal energy lost, and many additional devices and steps would be involved.

This is quite obvious from the fact that the circulation of unreacted gas in the synthesis of urea is in the form of an aqueous solution or liquid ammonia.

According to the present invention, these problems have been solved and a new device which can easily circulate a high-temperature, high-pressure gas has been developed. A single reaction vessel is divided into an upper portion comprising $2/3$–$3/4$ of the vessel and defining the first stage reaction zone in which the greater part of the reaction transforming urea into melamine takes place and a lower portion for the second stage reaction zone where the first stage reaction is completed. Between the first reaction zone and the second reaction zone, is a partition provided with a small orifice through which the reaction liquid of the first stage trickles down, and a second partition provided with a guide pipe which carries the used ammonia-containing gas of the second stage reaction upward, together with the accompanying reaction liquid of second stage, and depending pipes which carry into the second stage reaction zone a mixture of the trickling first stage reaction liquid with the second stage reaction liquid. There is an outlet pipe for the reaction gas at the top of the first stage reaction zone and below it an inlet pipe for molten urea. The device is also provided with an inlet pipe for ammonia gas and an output pipe for the second stage reaction liquid at the bottom of the second stage reaction zone.

This invention is extremely economical, because it does not require a plurality of expensive pressure vessels or extensive transfer means. Moreover, the heat of the ammonia-containing gas used in the second stage reaction can be fully utilized.

A further advantage of this invention resides in the use of gas to circulate the second stage reaction liquid to promote the reaction between the first stage reaction liquid and the pure ammonia gas in contact with the former in the second reaction zone.

The crude liquid passes from the first stage reaction zone down the several depending pipes around the second stage reaction zone wherein it is mixed with the circulating second stage reaction liquid, and eventually is delivered to the bottom of the second stage reaction zone. But this liquid is again blown upward to the bottom of the first stage reaction zone by the force of ammonia gas drawn in at the center of the bottom of the second stage reaction zone, and thus, it comes into full contact with the ammonia gas, thereby completing the reaction.

One embodiment of the invention will be now described with reference to the attached drawings which schematically illustrate an example of the apparatus according to the present invention.

Figure 1:
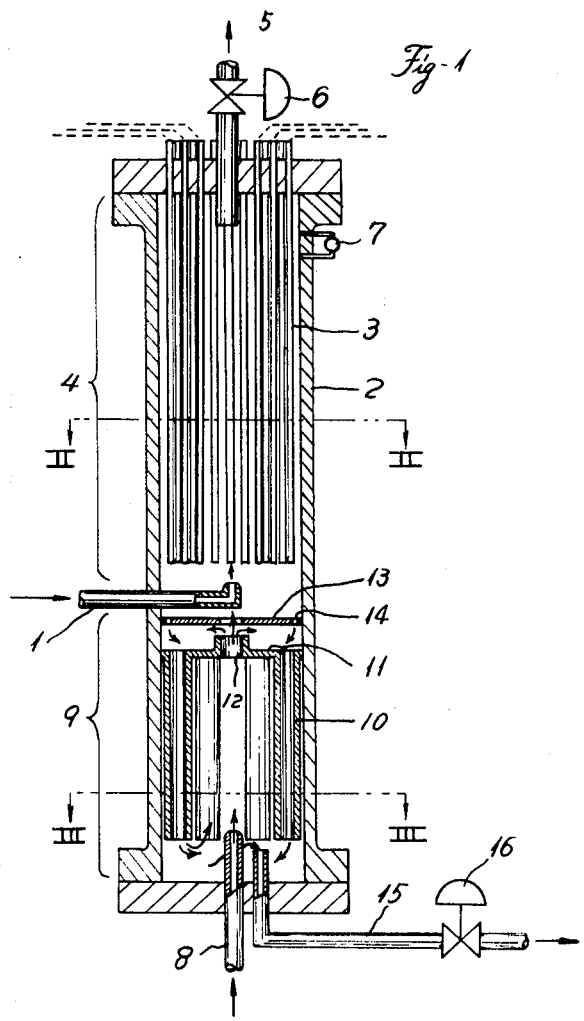
FIG. 1 is a schematic sectional view taken through the vertical axis of the apparatus.
Figure 2:
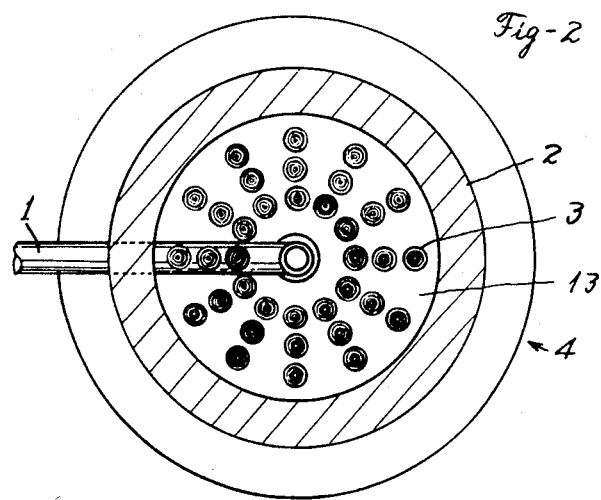
FIG. 2 is a schematic horizontal sectional view taken along the line II—II of FIG. 1.
Figure 3:
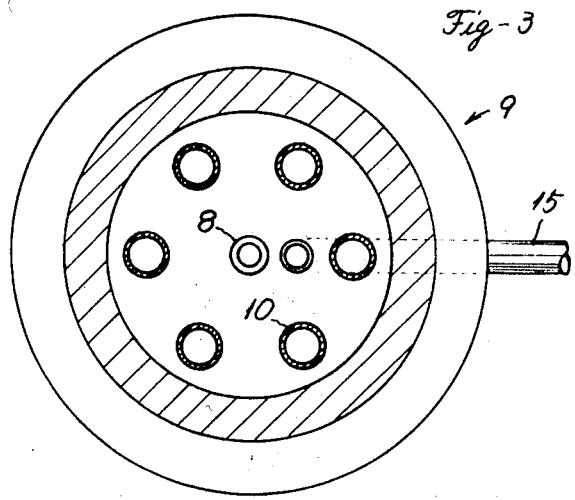
FIG. 3 is a schematic horizontal sectional view taken along the line III—III of FIG. 1.

As shown in the drawings, pipe 1 for urea extends through the wall of a cylindrical pressure-proof reaction vessel 2.

Said pipe 1 enters said vessel 2 at a point at least one-fourth of the way up from its bottom and terminates in an opening which leads to the center of the vessel 2. A large number of electric heaters 3 are positioned in the upper part of the vessel 2 above the pipe 1 and the space surrounding these heaters 3 constitutes the first stage reaction zone 4. At the center of the top of said vessel 2 there is an outlet pipe 5 for the reaction product gas, said pipe being equipped with a valve 6. A liquid level indicator 7 is mounted near the top of one side of the vessel.

The part below the first partition 13 constitutes the second reaction zone 9, and contains the second partition 11, the depending pipes 10, the guide pipe 12, the ammonia inlet pipe 8 and the pipe 15 through which the reaction liquid is extracted. The pipe 15 is controlled by the valve 16.

The vertical pipes 10, which depend from the second partition, are arranged in a circle within the inner wall of the reaction vessel 2 with the tips of the pipes directed toward the bottom of the reaction vessel 2. These pipes extend downwardly at least as far as the upper end of the ammonia suction pipe 8 so that the ammonia gas drawn into the reaction vessel 2 from said pipe 8 will not enter the pipes 10. The second partition 11 has an opening at the center and the ascending ammonia-containing gas rises through the communicating guide pipe 12 into the first reaction zone 4. The upper end of the outlet pipe 15 through which the liquid reaction product is extracted is set lower than the upper end of the ammonia suction pipe 8 so the ammonia gas does not enter into said pipe 15.

The first partition 13 is 1,200 mm. above the bottom of the titanium-lined reaction vessel 2. This vessel has an inside diameter of 500 mm. and is 3,700 mm. in height. The pipe 1 for introducing molten urea pierces the wall of the reaction vessel 2 at a point 1,400 mm. above its bottom. Its inner end is made of titanium and has an inner diameter of 30 mm.

Above the first partition 13 are thirty-six titanium-coated electric heaters having a total capacity of 200 kw. and extending through the top cover of the reaction vessel 2. The space above the partition 13 constitutes the first stage reaction zone 4. The first partition 13 is a 20 mm. thick disc made of titanium with a central opening 100 mm. in diameter; and pierced by six small holes 14 which are 10 mm. in diameter and are radially arranged about the center of the apparatus on the perimeter of a circle having a diameter of 440 mm. The second partition is a 20 mm. thick disc made of titanium, which is located 1,000 mm. above the bottom of the vessel 2. This second disc is centrally pierced by an ascending guide pipe made of titanium, having a diameter of 100 mm. and a height of 120 mm. Six depending pipes 10 of titanium, 60 mm. in diameter and 800 mm. in length are arranged radially on the perimeter of a circle having a diameter of 400 mm. The lower tips of the depending pipes 10 open toward the bottom at a point 200 mm. thereabove. The ammonia suction tube 8 is made of titanium. Its diameter is 30 mm. and its length is 250 mm. The pipe 15 through which the reaction liquid is extracted is 100 mm. from the center of the bottom, extends 150 mm. thereabove, and is 20 mm. in diameter. The other end of said pipe 15 leads through the bottom of the vessel 2 to the valve 16.

When utilizing the device according to this invention, molten urea is sprayed into the reaction vessel 2 from the urea-introducing pipe 1 and ammonia gas is sprayed from the ammonia inlet pipe 8. The ammonia-containing gas which has been used in the second reaction zone 9 rises into the first zone 4 and reaction takes place in the first reaction zone 4 between the molten urea and the ammonia-containing gas.

Since the quantity of carbon dioxide gas produced in the second reaction is relatively small, the ammonia-containing gas supplied to the first reaction zone 4 consists mainly of ammonia. After the first reaction carried out at a temperature of 360° C.–450° C., and under a pressure of 60–150 kg./cm.$^2$, with ammonia being added to the urea at a weight ratio of 0.2–0.6, the purity of the melamine obtained will be expected to be 94–96%. On account of the ammonia-containing gas from the second reaction zone 9 and the gas generated in the first reaction zone 4, the first reaction zone 4 is kept in a violent state of agitation, but in the space just above the first partition there is a relatively bubble-free crude liquid, which trickles through the small orifices 14 bored in the first partition 13, flowing between the first partition 13 and the second partition 11, where it mixes with the circulating stream of the second reaction liquid, and then travels down the depending pipes 10 into the bottom of the second reaction zone 9.

The ammonia gas injected from the bottom of the second reaction zone 9 completes the reaction of this liquid and enhances its purity. The central portion of the second reaction zone 9 is violently agitated on account of the ammonia gas, and accordingly, the apparent sepcific gravity of the liquid as a whole is presumably about 10% lower than that of the liquid in the depending pipes 10. As the result, a circulation of liquid takes place because of the difference in specific gravity between the liquid in the depending pipes 10 and that in the center of the vessel. The liquid and gas rising through the center are separated at the top of the guide pipe 12, with the liquid flowing between the first partition 13 and the second partition 11 and going down the depending pipes 10 together with the crude liquid from the orifices 14. The circulation amounts to about 5–20 times the quantity of crude melamine solution obtained in any given unit time, so that the circulating liquid will contain over 99% pure melamine. The second stage reaction requires a small amount of heat which it derives by absorbing from the crude liquid itself sufficient heat to lower the temperature of that liquid by about 10%. There is therefore no need to heat the reaction zone 9. It is, however, possible to provide an eletcric heater in the second reaction zone 9 or to supply the ammonia gas at a temperature about 50° C. higher than that of the liquid. The high purity melamine solution thus obtained is wtihdrawn from the reaction vessel 2 through the extracting pipe 15 and the extracing valve 16, and reated by a known method to yield powdered melamine. The extracting valve 16 serves as a sort of automatic control valve. It is interlocked with the liquid level indicator 7 at the top of the first reaction zone 4 and acts to keep the liquid level in the reaction vessel 2 constant. From the top of the vessel 2, the mixture of carbon dioxide gas and ammonia produced as the result of the whole reaction is removed through the gas outlet valve 6. The pressure in the reaction vessel 2 can be adjusted to a desired pressure of 60–150 kg./cm.$^2$ by means of the gas outlet valve 6.

When a titanium-lined reaction vessel having an inside diameter of 500 mm. and 3,700 mm. high is employed, and 500 kg./h. of urea solution at 140° C., and 250 kg./h. of ammonia gas at 400° C., are supplied so that the pressure of the whole reaction system may be 80 kg./cm.$^2$ and the reaction may take place at a first reaction temperature of 390° C., the second reaction temperature will be 382° C. After extracting melamine solution with the liquid level kept at 200 mm. from the top and rapidly cooling and hardening it, 99.2% melamine is yielded at a rate of 168 kg./h. This represents a yield of 95% for the theoretical ratio of one mol of melamine to six mols of urea.

What is claimed is:

1. Apparatus for the continuous production of melamine, said apparatus comprising in combination:
   a reaction vessel,
   a first partition dividing said vessel into upper and lower reaction zones, said first partition being pierced by a large central orifice and a plurality of smaller orifices spaced from said central orifice,
   a second partition below and approximately parallel to said first partition, said second partition being pierced by a central orifice registering with the central orifice in said first partition and by a plurality of additional orifices spaced from said central orifices,
   a pipe extending downward from each of said additional orifices and terminating in an open end above the bottom of said vessel,
   means for introducing molten urea at a point near the bottom of said upper reaction zone,
   an otulet for gaseous reaction products near the top of said upper reaction zone,
   means for introducing gaseous ammonia near the bottom of said lower reaction zone at a point at least as high as the lower ends of said pipes, and
   means for withdrawing a liquid reaction product from a point near the bottom of said lower reaction zone below the point at which said ammonia is introduced.

2. Apparatus as claimed in claim 1 in which the central orifice in said second partition communicates with a substantially vertical pipe leading upwardly therefrom and terminating at a point below the central orifice in said first partition.

3. Apparatus as claimed in claim 1 comprising heating means positioned in said upper reaction zone.

4. Apparatus as claimed in claim 1 in which said means for introducing molten urea is a pipe piercing the outer wall and terminating in an upwardly directed opening alignment with said central orifices.

5. Apparatus as claimed in claim 1 comprising means for heating said upper reaction zone.

6. Apparatus as claimed in claim 1 in which said means for introducing gaseous ammonia opens into said vessel at a point in alignment with said registering orifices.

References Cited

UNITED STATES PATENTS 3,271,116   9/1966   Hazelton _____ 23—284

JAMES H. TAYMAN, Jr., *Primary Examiner.*

U.S. Cl. X.R

23—283, 290; 261—114; 260—249.7